US012784269B2

(12) United States Patent
Stryzheus et al.

(10) Patent No.: US 12,784,269 B2
(45) Date of Patent: Nov. 3, 2026

(54) SYSTEM AND METHOD FOR ESTABLISHING THE POSITION OF A TOOL RELATIVE TO A STRUCTURE

(71) Applicant: The Boeing Company, Arlington, VA (US)

(72) Inventors: Veniamin Stryzheus, Kent, WA (US); Shereef Shehab, Seattle, WA (US)

(73) Assignee: The Boeing Company, Arlington, VA (US)

(*) Notice: Subject to any disclaimer, the term of this patent is extended or adjusted under 35 U.S.C. 154(b) by 87 days.

(21) Appl. No.: 18/473,162

(22) Filed: Sep. 22, 2023

(65) Prior Publication Data

US 2025/0104275 A1 Mar. 27, 2025

(51) Int. Cl.

| | |
|---|---|
| ***G06T 7/73*** | (2017.01) |
| ***G06T 19/00*** | (2011.01) |
| ***H04N 23/54*** | (2023.01) |
| ***H04N 23/90*** | (2023.01) |

(52) U.S. Cl.

CPC ................ *G06T 7/74* (2017.01); *G06T 19/00* (2013.01); *H04N 23/54* (2023.01); *H04N 23/90* (2023.01); *G06T 2200/24* (2013.01); *G06T 2207/30108* (2013.01); *G06T 2219/004* (2013.01)

(58) Field of Classification Search

CPC ....... G06T 7/74; G06T 19/00; G06T 2200/24; G06T 2207/30108; G06T 2219/004; H04N 23/54; H04N 23/90

USPC .......................................................... 348/159

See application file for complete search history.

(56) References Cited

U.S. PATENT DOCUMENTS

| | | | | |
|---|---|---|---|---|
| 2002/0169586 A1* | 11/2002 | Rankin, II | G06T 7/0004 | 703/1 |
| 2009/0086199 A1* | 4/2009 | Troy | G01S 7/497 | 356/251 |
| 2013/0342657 A1* | 12/2013 | Robertson | H04N 13/239 | 348/47 |

(Continued)

FOREIGN PATENT DOCUMENTS

| | | |
|---|---|---|
| EP | 2703776 | 3/2020 |
| EP | 3208774 | 9/2021 |
| EP | 3549874 | 12/2022 |

OTHER PUBLICATIONS

EPO, Extended European Search Report, Appl. No. 24186088.1, issued Jan. 28, 2025.

(Continued)

*Primary Examiner* — Matthew David Kim

(57) ABSTRACT

A tool positioning system comprises a processor and two or more cameras. The cameras are includable with a tool that is spaced apart from a structure. Each camera is configured to capture an image of a local region of the structure from a unique viewing perspective. The processor compares the images to an as-designed digital model of the structure and recognize one or more structural features that appear in every image. In addition, the processor extracts a nominal three-dimensional location of the one or more structural features from the as-designed digital model, and define a geometric relationship between the cameras and the structure based on the nominal three-dimensional location of the one or more structural features, to thereby establish the position of the tool relative to the structure.

20 Claims, 11 Drawing Sheets

(56) References Cited

U.S. PATENT DOCUMENTS

| | | | | |
|---|---|---|---|---|
| 2014/0055570 | A1* | 2/2014 | Dehais | G06T 17/10 348/47 |
| 2015/0126223 | A1* | 5/2015 | Lee | H04W 4/021 455/456.3 |
| 2015/0317780 | A1* | 11/2015 | Dumont | G01C 11/30 348/47 |
| 2016/0063704 | A1* | 3/2016 | Sasaki | G06T 7/80 382/154 |
| 2018/0250822 | A1* | 9/2018 | Shimodaira | B25J 9/1697 |
| 2018/0336733 | A1* | 11/2018 | Koga | G06T 7/60 |
| 2020/0074659 | A1* | 3/2020 | Nakagawa | G06V 10/752 |
| 2022/0079687 | A1* | 3/2022 | Sexson | A61B 34/20 |
| 2022/0152834 | A1* | 5/2022 | Kupcsik | B25J 9/1612 |
| 2022/0179202 | A1* | 6/2022 | Yang | G01B 11/2504 |
| 2023/0010196 | A1* | 1/2023 | Moriyama | G06V 10/764 |
| 2024/0028781 | A1* | 1/2024 | Yoshida | H04N 23/72 |
| 2024/0100698 | A1* | 3/2024 | Hayashi | B25J 9/1664 |
| 2024/0280961 | A1* | 8/2024 | Moody | G05B 19/4083 |
| 2024/0362985 | A1* | 10/2024 | Tucker | G06V 10/235 |
| 2025/0046046 | A1* | 2/2025 | Nakatani | G06V 10/12 |

OTHER PUBLICATIONS

Wikipedia, “Photogrammetry,” available at <https://en.wikipedia.org/wiki/Photogrammetry>; retrieved on Aug. 26, 2023.
Wikipedia, “Photometric stereo,” available at <https://en.wikipedia.org/wiki/Photometric_stereo#>; retrieved on Aug. 26, 2023.
Zeiss, “ATOS Scanner datasheet,” retrieved on Aug. 21, 2023.

* cited by examiner

SYSTEM AND METHOD FOR ESTABLISHING THE POSITION OF A TOOL RELATIVE TO A STRUCTURE

FIELD

The present disclosure relates generally to inspection systems and, more particularly, to a system and method for establishing the position of a tool, such as an inspection instrument, relative to a structure.

BACKGROUND

Within the commercial aircraft industry, inspections are an essential part of the production process and ongoing maintenance for ensuring the quality and safety of the aircraft. One inspection technique involves the use of a three-dimensional (3D) scanner configured to scan the aircraft and generate a 3D digital representation of the scanned surfaces. The digital representation is highly accurate, allowing for the detection of non-conformances in the scanned surfaces. It is important to know the position of the 3D scanner relative to the aircraft so that if a non-conformance is discovered during analysis of the digital representation, the non-conformance can be located on the aircraft and corrected.

Conventional methods for determining the position of an inspection instrument relative to a structure require the manual installation of physical markers or targets on regions of the structure to be inspected. For structures that are large in size, it can be difficult to access certain regions to apply physical targets, such as the vertical tail of a large commercial aircraft. For structures that have a large amount of surface area, manually applying physical targets to multiple regions of the structure is impractical.

As can be seen, there exists a need in the art for a system and method for establishing the position of a tool (e.g., an inspection instrument) relative to a structure without the need to install physical targets on the structure.

SUMMARY

The above-noted needs associated with inspection systems are addressed by the present disclosure, which provides a tool positioning system for establishing the position of a tool relative to a structure. The tool positioning system includes two or more cameras that are includable with the tool. Each camera is configured to capture an image of a local region of the structure from a unique viewing perspective. The tool positioning system also includes a processor configured to compare the images to an as-designed digital model of the structure and recognize one or more structural features that appear in the images. In addition, the processor is configured to extract a nominal three-dimensional location of the one or more structural features from the as-designed digital model. Additionally, the processor is configured to define a geometric relationship between the cameras and the structure based on the nominal three-dimensional location of the one or more structural features, to thereby establish the position of the tool relative to the structure.

Also disclosed is an inspection instrument having a processor and two cameras. The two cameras are each configured to capture at least one image of a structure respectively from a unique viewing perspective. The processor is configured to generate inspection data of the structure based on the images. In addition, the processor is configured to compare the images to an as-designed digital model of the structure and recognize one or more structural features present in every image, extract a nominal three-dimensional location of the one or more structural features from the as-designed digital model, and define a geometric relationship between the cameras and the structure based on the nominal three-dimensional location of the one or more structural features, to thereby establish the position of the inspection instrument relative to the structure at time of generating the inspection data.

The features, functions, and advantages that have been discussed can be achieved independently in various versions of the disclosure or may be combined in yet other versions, further details of which can be seen with reference to the following description and drawings.

BRIEF DESCRIPTION OF THE DRAWINGS

The disclosure can be better understood with reference to the following detailed description taken in conjunction with the accompanying drawings, which illustrate preferred and exemplary versions, but which are not necessarily drawn to scale. The drawings are examples and not meant as limitations on the description or the claims.

The figures shown in this disclosure represent various aspects of the versions presented. and only differences will be discussed in detail.

DETAILED DESCRIPTION

Disclosed versions will now be described more fully hereinafter with reference to the accompanying drawings, in which some, but not all of the disclosed versions are shown. Indeed, several different versions may be provided and should not be construed as limited to the versions set forth herein. Rather, these versions are provided so that this disclosure will be thorough and fully convey the scope of the disclosure to those skilled in the art.

This specification includes references to "one example," "an example," and "some examples." Instances of the phrases "one example," "an example," or "some examples" do not necessarily refer to the same example. Particular features, structures, or characteristics may be combined in any suitable manner consistent with this disclosure.

As used herein, "comprising" is an open-ended term, and as used in the claims, this term does not foreclose additional structures or steps.

As used herein, "configured to" means various parts or components may be described or claimed as "configured to" perform a task or tasks. In such contexts, "configured to" is used to connote structure by indicating that the parts or components include structure that performs those task or tasks during operation. As such, the parts or components can be said to be configured to perform the task even when the specified part or component is not currently operational (e.g., is not on).

As used herein, an element or step recited in the singular and preceded by the word "a" or "an" should be understood as not necessarily excluding the plural of the elements or steps. As used herein, the term "and/or" includes any and all combinations of one or more of the associated listed items. As also used herein, the term "combinations thereof" includes combinations having at least one of the associated listed items, wherein the combination can further include additional, like non-listed items.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

Figure 1:
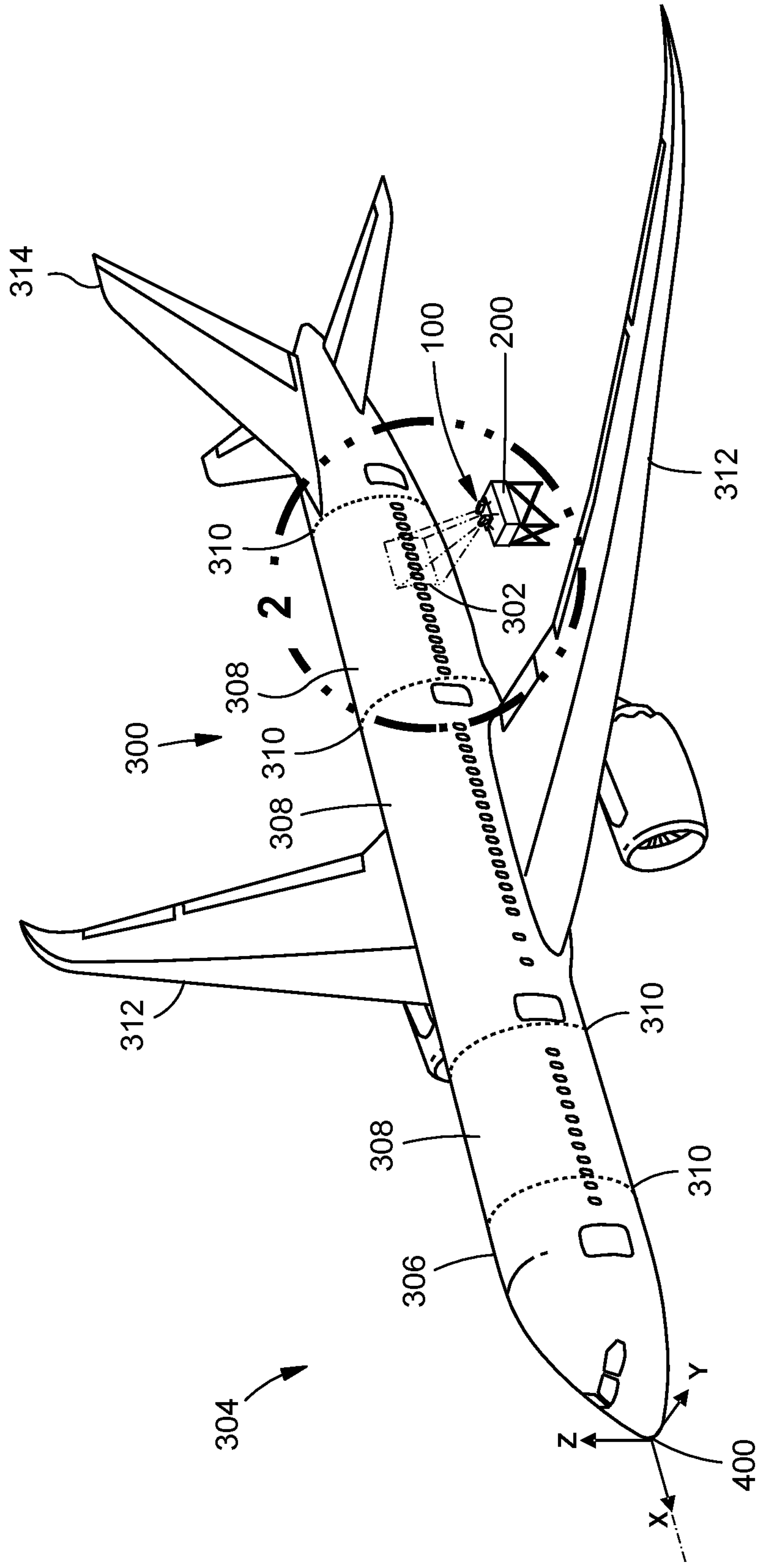
FIG. 1 shows an example of an aircraft having a fuselage comprised of end-to-end barrel sections.

Referring now to the drawings which illustrate various examples of the disclosure, shown in FIG. 1 is an aircraft 304, which serves as an example for which the presently disclosed tool positioning system 100 (FIG. 2) and method 500 (FIG. 13) are used for determining or establishing the position of a tool 200 relative to a structure 300. The aircraft 304 includes a fuselage 306, a pair of wings 312, and an empennage containing tail surfaces 314 such as horizontal elevator and a vertical fin. In the example shown, the fuselage 306 is comprised of separately manufactured barrel sections 308 which are subsequently joined end-to-end at a plurality of section joins 310, as illustrated in FIGS. 1-2.

Figure 2:
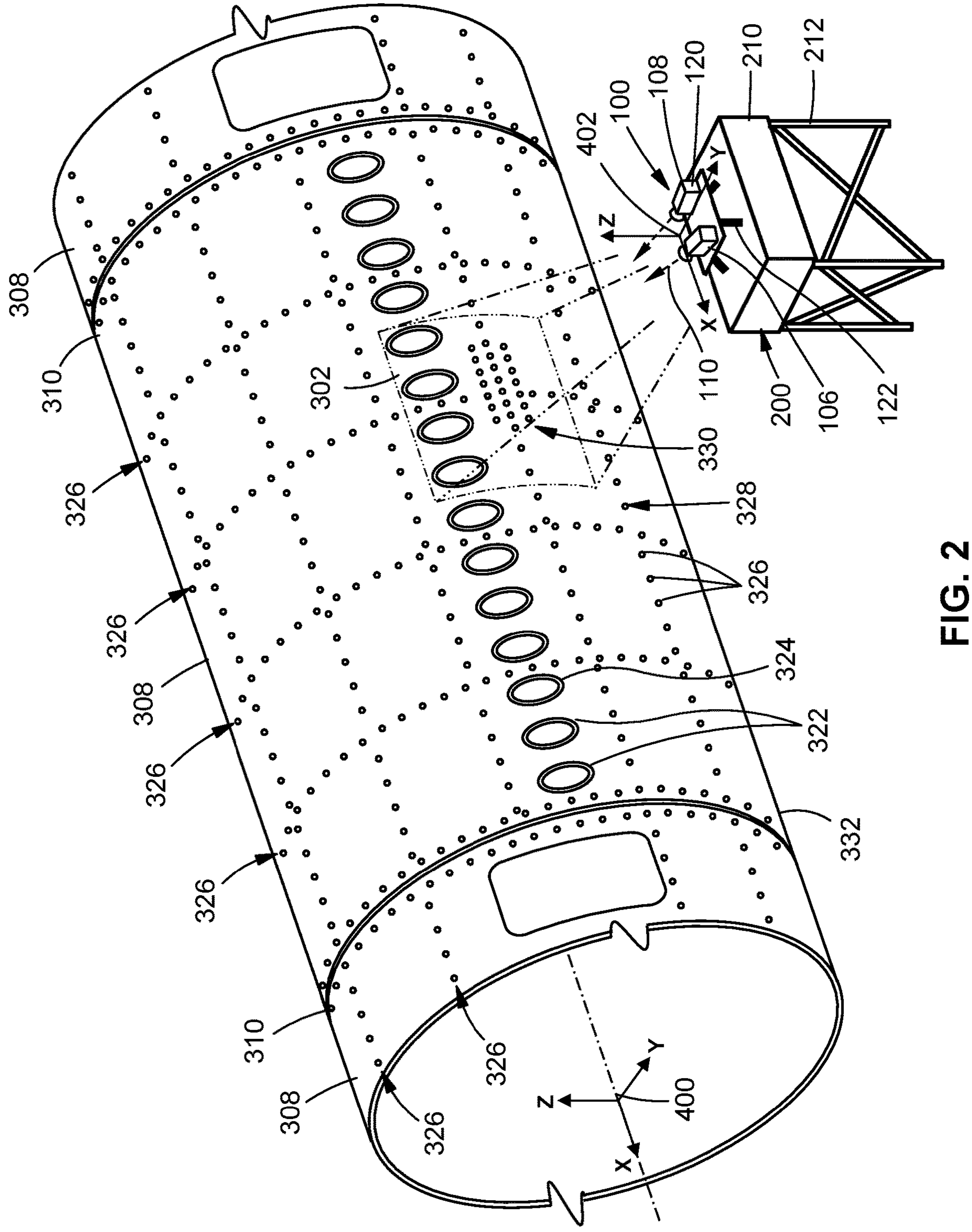
FIG. 2 shows an example of one of the barrel sections of FIG. 1, and illustrating the presently disclosed tool positioning system mounted on top of an inspection instrument in the form of a three-dimensional (3D) scanner for scanning a local region of the barrel section.

In the example of FIG. 2, the barrel section 308 has a generally cylindrical shape having rows of passenger windows 322 on opposing sides of the barrel section 308. The windows 322 each have a window surround 324 providing local strength reinforcement around the window openings in the barrel section 308. In some examples, the barrel section 308 is of metallic construction and the exterior surface is defined by skin panels that are coupled via fasteners 326 to internal structural members such as longerons (not shown) and circumferential frames (not shown).

Although described in the context of an aircraft 304, the tool positioning system 100 can be implemented for establishing the position of a tool 200 relative to any one of a variety of different types of structures 300, and is not limited to an aircraft 304. The structure 300 can be of metallic construction (e.g., aluminum, etc.) and/or non-metallic construction (e.g., carbon-fiber composite material). Furthermore, although the tool 200 in the present disclosure is an inspection instrument 202 (e.g., a three-dimensional (3D) scanner), the tool positioning system 100 can be implemented for establishing the position of any one of a variety of different types of tools 200 including, but not limited to, manufacturing tools, testing tools, measuring tools, maintenance tools, and any other type of tool. The tool 200 can be provided in any one of a variety of different forms, and is not limited to an instrument. For example, the tool 200 can be a device, a component, a machine, an assembly, a subassembly, a system, or a subsystem.

Figure 3:
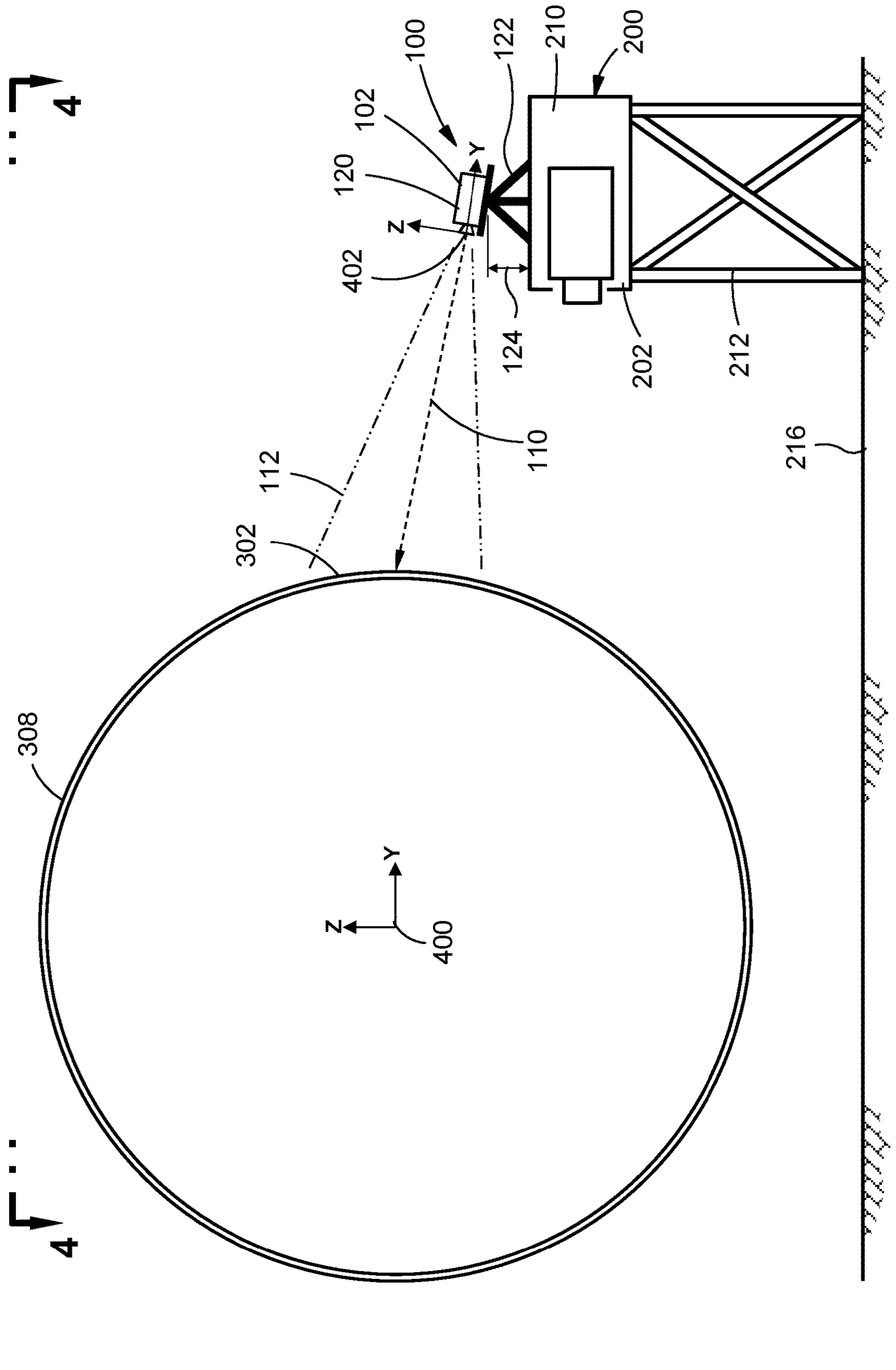
FIG. 3 is an end view of the barrel section of FIG. 2 showing the tool positioning system mounted on the 3D scanner.
Figure 4:
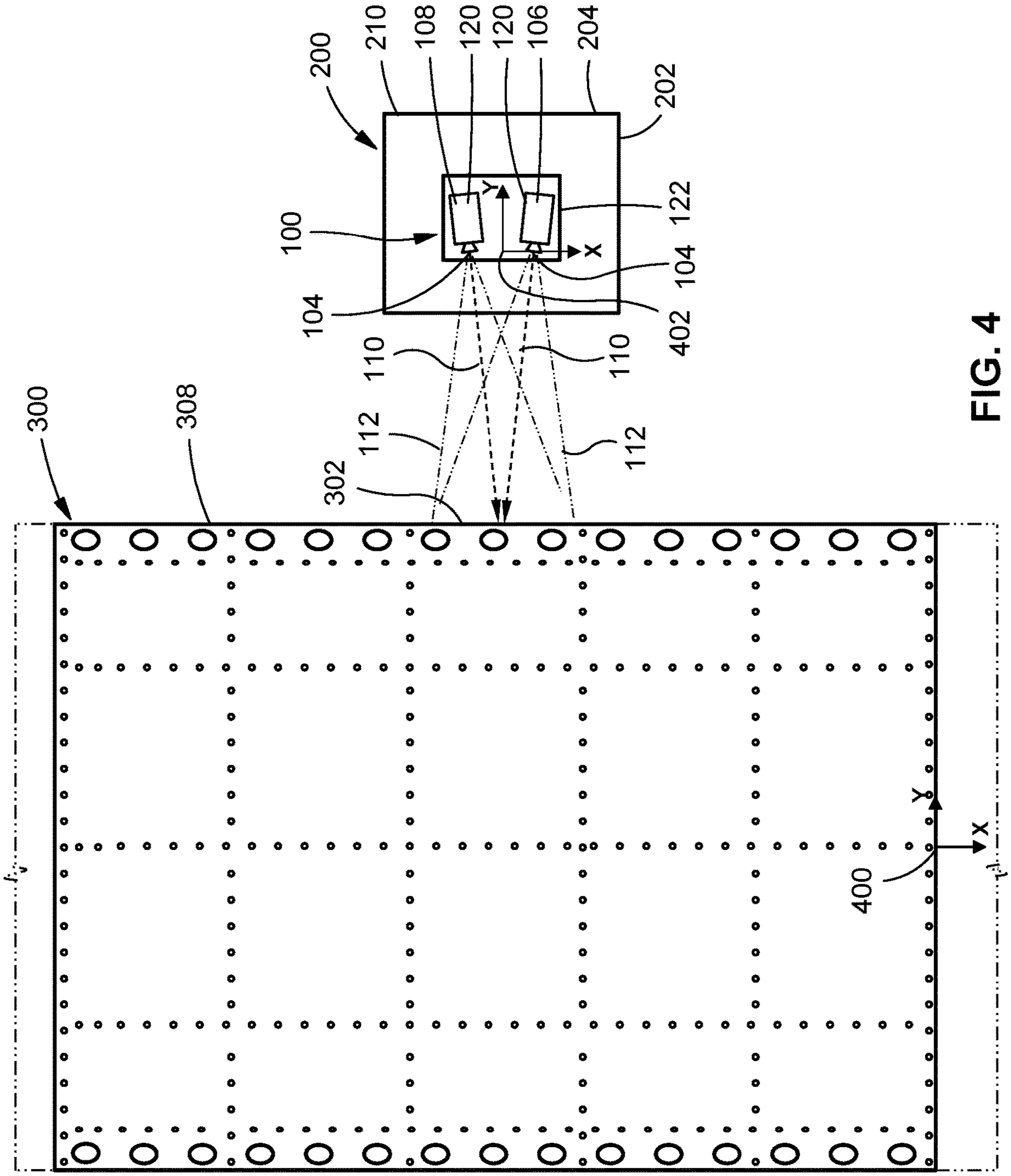
FIG. 4 is a top view of the barrel section of FIG. 3 showing the tool positioning system having two cameras (e.g., a first camera and a second camera) mounted on the 3D scanner for capturing images of a local region of the barrel section from different viewing perspectives.
Figure 5:
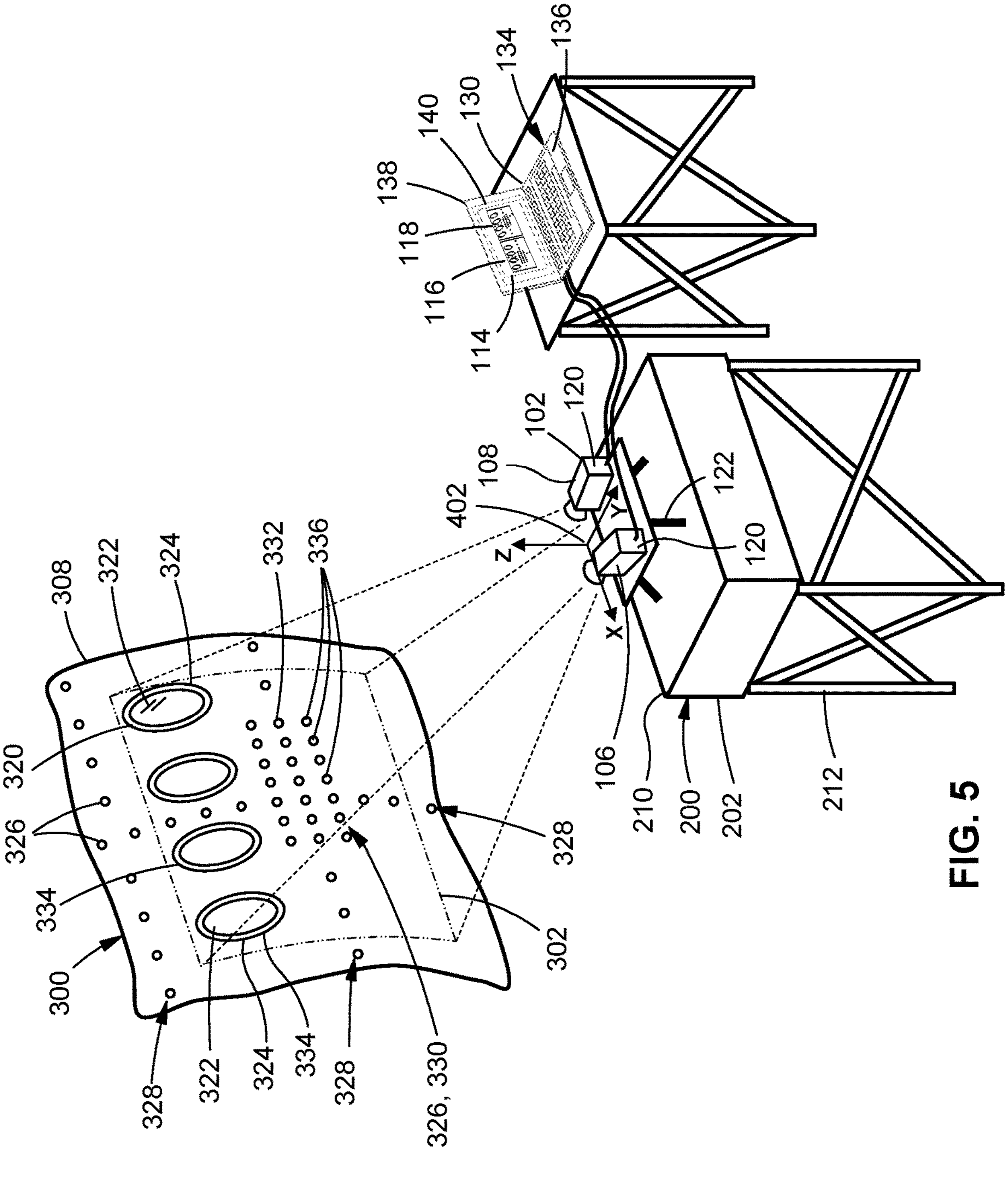
FIG. 5 is a magnified view of a portion of the barrel section showing the first and second cameras of the tool positioning system mounted on the 3D scanner which is supported on a tool support fixture, and further illustrating an overlap of the field of view of the first camera with the field of view of the second camera to define the local region on the barrel section.

Referring to FIGS. 1-5, the tool positioning system 100 includes at least two cameras 102 and a processor 130 (FIG. 5). The cameras 102 are includable with the tool 200, and are configured to capture images 114 (FIG. 5) of a common local region 302 of the structure 300 from different viewing perspectives. As described in greater detail below, the processor 130 is configured to compare the images 114 of the local region 302 to an as-designed digital model 150 (FIG. 11) of the structure 300, and recognize one or more structural features 320 that are part of the structure 300, and which also appear in each of the images 114. As described below, the one or more structural features 320 that appear in the images 114 (e.g., a first image 116 and a second image 118) collectively include at least three unique elements 336 (FIG. 5). The processor 130 is configured to extract the nominal three-dimensional location(s) of the one or more structural features 320 from the as-designed digital model 150, and define a geometric relationship between the cameras 102 and the structure 300 based on the nominal three-dimensional location(s) of the one or more structural features 320, to thereby establish the position of the tool 200 relative to the structure 300, as described below. Advantageously, the tool positioning system 100 omits the need for manually installed reference targets to determine the position of the tool 200 relative to the structure 300.

The cameras 102 (e.g., a first camera 106 and a second camera 108) of the tool positioning system 100 each have a unique viewing direction 110 (FIG. 4), and each viewing direction 110 points generally toward the common local region 302 of the structure 300. In addition, the cameras 102 are oriented such that their fields of view 112 at least partially overlap. For example, in FIG. 4, the field of view 112 of the first camera 106 overlaps the field of view 112 of the second camera 108, thereby providing stereo vision of the local region 302. The local region 302 is defined by the overlapping portions of the fields of view 112 of the cameras 102. The first camera 106 and second camera 108 are spaced apart from each other. In addition, the first camera 106 and second camera 108 are oriented such that the viewing directions 110 form a slight angle which can range from 1-45 degrees or more. In addition, each camera 102 is preferably oriented such that its viewing direction 110 is non-normal to the surfaces of the local region 302. In one example, the cameras 102 are oriented such that the viewing direction 110 of each camera 102 forms an angle of between 1-45 degrees relative to a local normal to the surface of the local region 302. However, the viewing direction 110 of each camera 102 can be oriented at any angle relative to a local normal of the local region 302. In the present disclosure, the viewing direction 110 of each camera 102 is generally centered within its field of view 112.

Although the tool positioning system 100 is described in the present disclosure as having two cameras 102 (e.g., a first camera 106 and a second camera 108), other examples of the tool positioning system 100 can have more than two cameras 102 mounted on or adjacent to a tool 200. For example, a tool positioning system 100 can have three or more cameras 102, each having a different viewing direction 110 respectively providing three or more unique viewing perspectives of a common local region 302 of a structure 300.

In FIGS. 1-5, the cameras 102 of the tool positioning system 100 are standalone cameras 120 that are separate components from the tool 200. The standalone cameras 120 can be temporarily or permanently mounted on or adjacent to the tool 200. The processor 130 is configured to compensate for an offset distance 124 (FIG. 3) between the standalone cameras 120 and the tool 200 when establishing the position of the tool 200 relative to the structure 300. The standalone cameras 120 are mounted or oriented in a manner such that each camera 102 has a unique viewing perspective of the local region 302 of the structure 300. In FIGS. 1-5, the standalone cameras 120 are mounted on a camera mounting fixture 122 having mounting legs for supporting the standalone cameras 120 on the tool 200. Although not shown, each standalone camera 120 can be mounted on a swivel (not shown) for independently adjusting the orientation of each standalone camera 120 in a manner such that the fields of view 112 of the standalone cameras 120 at least partially overlap each other on the structure 300.

Referring to FIGS. 6-10, shown is an example of the tool positioning system 100 in which the cameras 102 are tool cameras 208 that are integrated or built into the tool 200. In addition to performing operations associated with the main purpose of the tool 200, tool cameras 208 are also configured to capture images 114 (FIG. 12) of a structure 300 for establishing the position of the tool 200 relative to the structure 300. For example, the tool 200 in FIGS. 6-10 is an inspection instrument 202 in the form of a 3D scanner 204 containing two tool cameras 208. In this example, the tool cameras 208 are configured to perform dual functions, including (1) capturing images 114 of a local region 302 of a structure 300 from unique viewing perspectives for the purpose of establishing the position of the 3D scanner 204 relative to the structure 300, and (2) scanning the exterior surfaces of the structure 300 for the purpose of generating a digital reconstruction of the structure 300 to allow the condition of the structure 300 to be assessed, such as inspecting the structure 300 for non-conformances.

Although FIGS. 1-5 show each camera 102 as a standalone camera 120 and FIGS. 6-10 show each camera 102 as a tool camera 208, in other examples of the tool positioning system 100 not shown, one or more of the cameras 102 can be a standalone camera 120, and the remaining one or more cameras 102 can be a tool camera 208. Regardless of whether the cameras 102 of the tool positioning system 100 are standalone cameras 120 and/or tool cameras 208, the cameras 102 of the tool positioning system 100 can be provided in any one of a variety of configurations. For example, the cameras 102 can be wide angle cameras machine vision cameras, and/or any one of a variety of other types of cameras capable of capturing images 114 of a structure 300 for establishing the position of the tool 200 relative to the structure 300.

Figure 12:
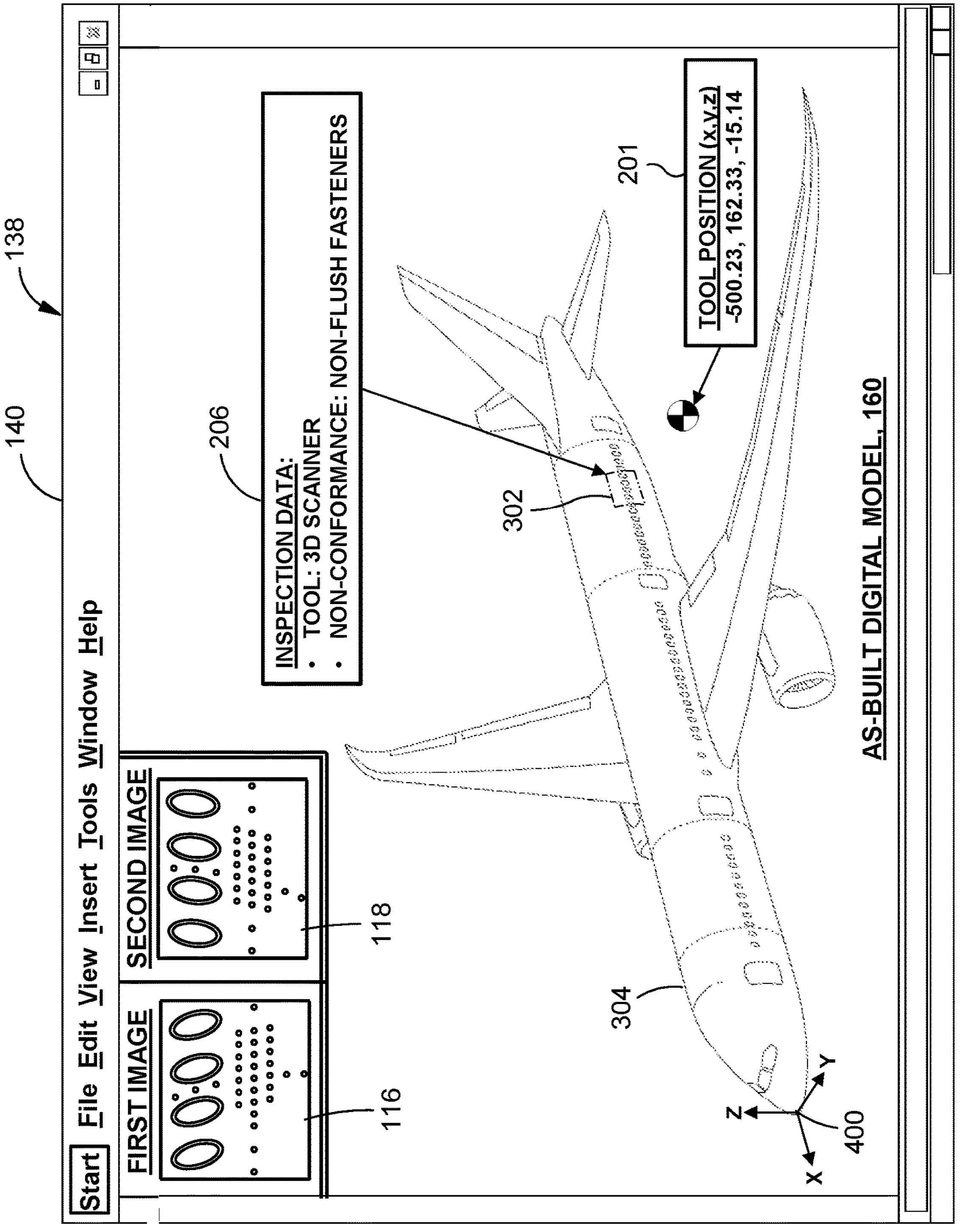
FIG. 12 shows an example of a display screen of a graphic user interface (GUI) displaying first and second images respectively captured by the first and second cameras of the tool positioning system of FIG. 5, and illustrating an as-built digital model of the aircraft annotated with the tool position and inspection data generated by the tool (e.g., an inspection instrument)

In the example of FIG. 5, the tool positioning system 100 includes a graphical user interface (GUI 138) which is part of a computing device 134. In the example shown, the computing device 134 is a laptop computer 136. However, the computing device 134 can be a desktop computer (not shown), a tablet (not shown), or any other type of computing device 134. The computing device 134 contains the processor 130, which is communicatively coupled to the cameras 102. The GUI 138 allows for manual control of the operation of the tool positioning system 100. For example, the GUI 138 allows for manually commanding the cameras 102 to capture images 114 of the structure 300. The GUI 138 of the laptop computer 136 includes a display screen 140 which can display the images 114 (e.g., in real time) captured by the cameras 102. In addition, the display screen 140 can display the as-designed digital model 150 of the structure 300, the structural feature 320 identified in the images 114, the position of the tool 200 relative to the structure 300, and/or an as-built digital model 160 of at least a portion (e.g., the local region 302) of the structure 300, as shown in FIG. 12 and described below.

Figure 7:
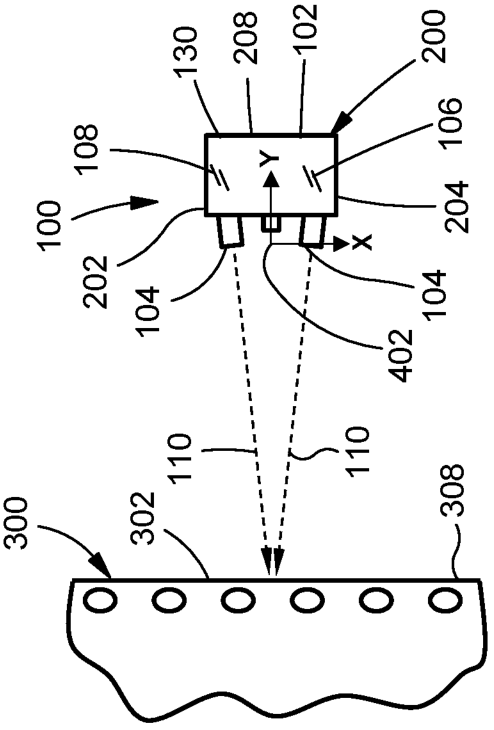
FIG. 7 is a top view of the tool positioning system integrated into the 3D scanner of FIG. 6.
Figure 6:
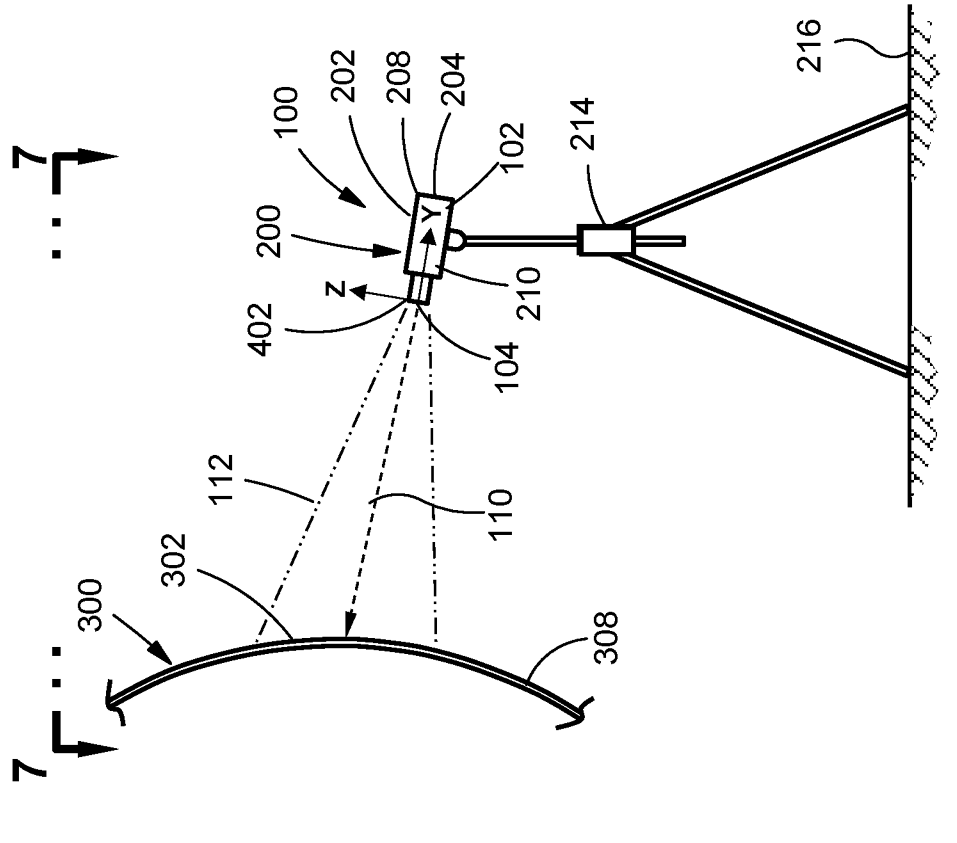
FIG. 6 is an end view of an example of the tool positioning system in which the first and second cameras are integrated into a 3D scanner that is supported on a tripod.

The tool 200 can be a stationary tool 210 or a non-stationary tool 218. In the example of FIGS. 1-7, the tool 200 is a stationary tool 210 mounted to a fixed object. In this regard, the stationary tool 210 is fixed in location relative to the structure 300. In FIGS. 1-5, the stationary tool 210 is mounted on a tool support fixture 212 which is supported on a floor 216 such as of a manufacturing facility. However, the stationary tool 210 can be fixedly coupled to a wall, a ceiling, or other type of fixed object. Furthermore, the fixed object can be located in any one of a variety of different types of environments, such as a factory, a maintenance facility, a hangar, or other environments. In addition, the fixed object can be located indoors or outdoors. FIGS. 6-7 show an example of a stationary tool 210 mounted on a tripod 214 which is supported on a floor 216. The stationary tool 210 is an inspection instrument 202 in the form of the above-mentioned 3D scanner 204. In this example, the cameras 102 (e.g., the first camera 106 and the second camera 108) of the tool positioning system 100 are tool cameras 208 that are integrated into the 3D scanner 204.

Figure 9:
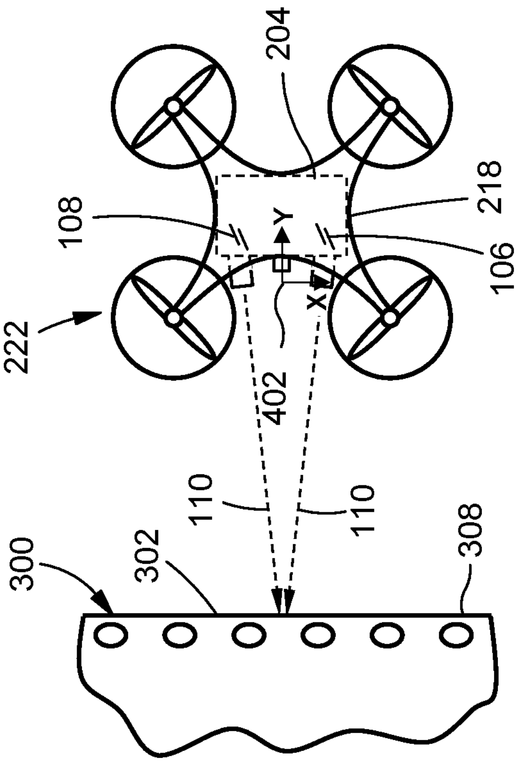
FIG. 9 is a top view of the tool positioning system integrated into 3D scanner supported of FIG. 8.
Figure 8:
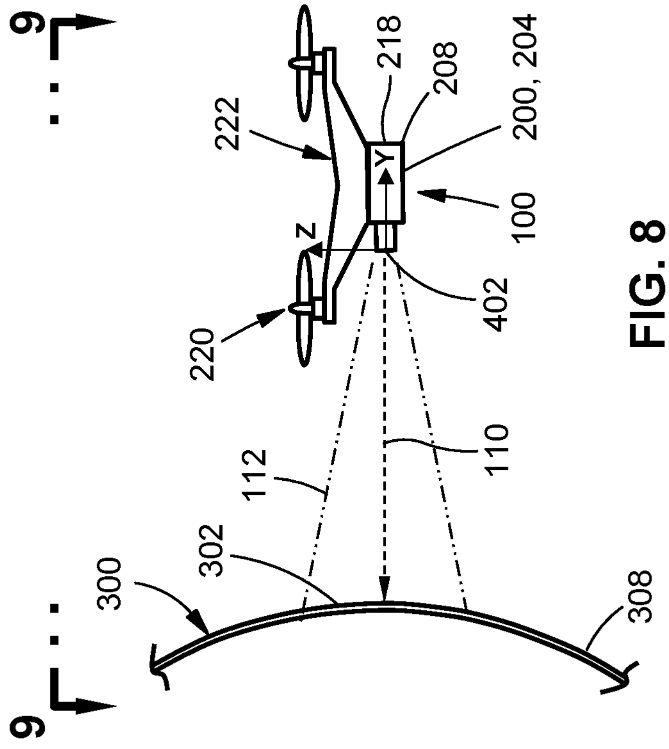
FIG. 8 is an end view of an example of the tool positioning system integrated into a 3D scanner that is supported by a drone.
Figure 10:
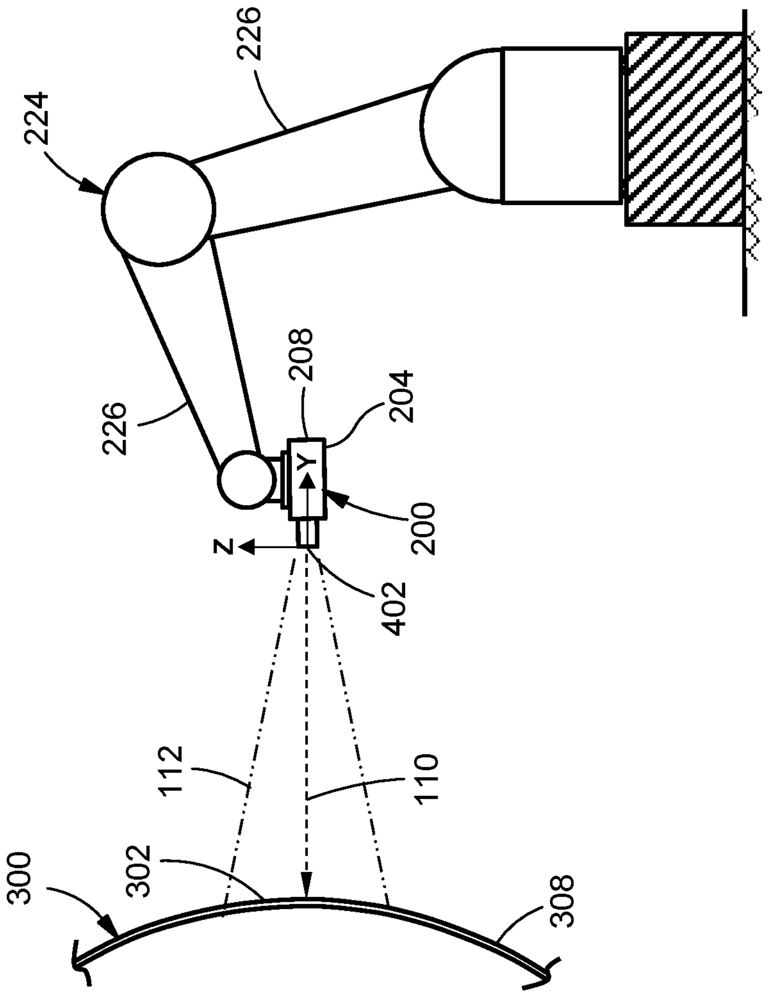
FIG. 10 is an end view of the tool positioning system integrated into a 3D scanner that is supported by a robotic device.

Referring to FIGS. 8-10, shown are examples of a tool positioning system 100 in which the tool 200 is a non-stationary tool 218 coupled to a movable platform 220. In FIGS. 8-9, the movable platform 220 is a remotely commanded (e.g., via a human) or autonomously commanded (i.e., preprogrammed) aerial vehicle or drone 222 having multiple propellers for supporting the tool 200 which, in the example shown, is a 3D scanner 204. The drone 222 is configured to hold the 3D scanner 204 in three-dimensional space while the tool cameras 208 of the 3D scanner 204 perform the above-mentioned dual functions of capturing images 114 of a common local region 302 of the structure 300 for establishing the position of the 3D scanner 204, and scanning the surfaces of the structure 300 for assessing (i.e., inspecting) the condition of the structure 300. In FIG. 10, the movable platform 220 is a robotic device 224 having robotic arms 226 and a base (not shown) that is movable along a robotic device track (not shown) for positioning the tool 200 at any location along a structure 300. The tool 200 in FIG. 10 is a 3D scanner 204 having tool cameras 208 configured to perform the same dual functions described above for the 3D scanner 204 of FIGS. 8-9. Although the movable platform 220 is shown in the present disclosure as a drone 222 or a robotic device 224, the movable platform 220 may be provided in any one of a variety of alternative configurations such as an overhead gantry (not shown) or other type of movable platform 220.

As mentioned above, the presently disclosed tool positioning system 100 is described in the context of establishing the position of a tool 200 in the form of an inspection instrument 202 such as a 3D scanner 204. In one example, the 3D scanner 204 is a structured light scanner such as the ATOS line of scanners commercially available from the Zeiss Group of Oberkochen, Germany. However, the tool positioning system 100 can be implemented for establishing the position of any one of a variety of alternative types of inspection instruments 202. For example, the inspection instrument 202 can be a laser scanner, a time-of-flight scanner, or any one of a variety of other types of inspection instruments 202 for performing any one of a variety of different types of inspection or metrology activities. For example, the tool 200 can be an inspection instrument 202 configured to perform surface inspections to detect non-conformances such as corrosion in metallic components, oversized gaps between structural components, wear and tear on surface coatings such as paint, and/or defects in fastener installations such as missing fasteners or non-flush countersunk fasteners. In some examples, the tool 200 can be an inspection instrument 202 configured to perform composite material inspections for detecting non-conformances such as voids, delaminations, and/or cracks in composite structures.

Figure 11:
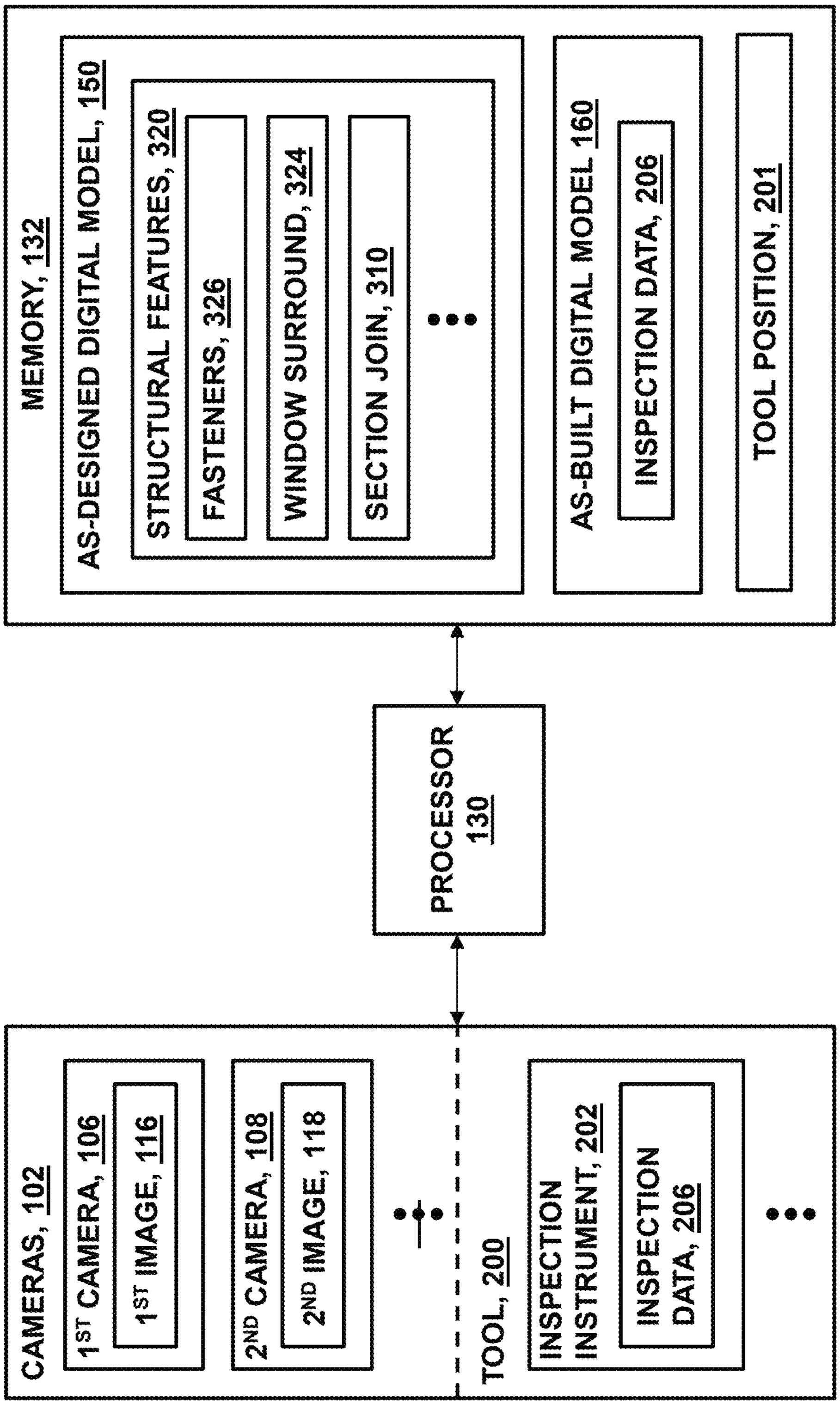
FIG. 11 is a block diagram representing examples of the presently disclosed tool positioning system.

Referring to FIG. 11, shown is a block diagram representing examples of the presently disclosed tool positioning system 100. As mentioned above, the processor 130 is configured to receive the images 114 (FIG. 5) of the local region 302 captured by the cameras 102. Using photogrammetry, the processor 130 compares the images 114 of the local region 302 to an as-designed digital model 150 (e.g., a computer-aided-design (CAD) model) of the structure 300. In FIG. 11, the as-designed digital model 150 is stored in a memory 132 that is communicatively coupled to or integrated into the processor 130. The processor 130 and the memory 132 can be integrated into a computing device 134, as mentioned above. The as-designed digital model 150 represents at least the portion of the structure 300 containing the local region 302. For the example of FIG. 2, the as-designed digital model 150 is that of a barrel section 308. In other examples, the as-designed digital model 150 can be that of the entire structure 300, such as the entire aircraft 304 of FIG. 1.

Included in the as-designed digital model 150 are structural features 320 that make up the structure 300. In this regard, the structural features 320 are integral to the structure 300 and are not applied to the structure 300 solely for the purpose of determining the position of a tool 200 relative to the structure 300. In the example of the barrel section 308 of FIGS. 1-2, structural features 320 can include the fasteners 326 (FIGS. 2, 4 and 5), various structural components 332 that make up the barrel section 308, and can also include non-structural components (not shown) of the barrel section 308. Examples of structural components 332 of the barrel section 308 include window surrounds 324 (e.g., FIGS. 2 and 5), section joins 310 (FIG. 2), and any one of a variety of other structural components 332 that are part of the as-designed digital model 150, and which can be captured in the images 114 generated by the cameras 102 of the tool positioning system 100.

The processor 130 is configured to recognize one or more structural features 320 that appear in the images 114 based on a comparison of the images 114 to the as-designed digital model 150. Recognition of the structural features 320 in the images 114 can be performed using a suitable object recognition technique such as image analysis, machine learning, or any other suitable object recognition technique. As mentioned above, the one or more structural features 320 collectively include at least three unique elements 336 respectively at different locations on the structure 300. In one example, the unique elements 336 can be comprised of three or more fasteners 326 in a non-repeating and/or non-standard pattern 330 of fasteners 326. For example, FIG. 5 shows a non-standard pattern 330 of fasteners 326 located near the approximate mid-point of the barrel section 308 underneath the row of windows 322. The non-standard pattern 330 of fasteners 326 is in addition to the standard pattern 328 of fasteners 326 that extend in lengthwise rows along the entire length of the barrel section 308 for coupling the skin panels to internal longerons (not shown) that extend the length of the barrel section 308, and the circumferential rows of fasteners 326 that fasten the skin panels to internal circumferential frames (not shown) of the barrel section 308.

As an alternative to or in addition to fasteners 326, the at least three unique elements 336 of the one or more structural features 320 can be comprised of three or more different corners or edges 334 of a single structural component 332. For example, in FIG. 5, the three or more unique elements 336 can be respectively comprised of three or more different edges 334 or sides of one of the window surrounds 324, or three or more edges 334 or corners of one of the section joins 310. Other examples of structural components 332 that can serve as a structural features 320 include inspection access doors (not shown), door surrounds (not shown) of passenger doors or cargo doors, edges 334 of skin panels such as of a wing 312, a fuselage 306, or a control surface (no shown), or any one of a variety of other types of structural components 332.

Upon recognizing one or more structural features 320 that appear in the images 114 of the local region 302 captured by the cameras 102, the processor 130 extracts the nominal three-dimensional location(s) of the one or more structural features 320 by querying the as-designed digital model 150. The nominal three-dimensional location(s) of the one or more structural features 320 can be provided in terms of their local coordinates (e.g., x,y,z coordinates) relative to the origin of the global coordinate system 400 of the structure 300.

The processor 130 defines a geometric relationship between the cameras 102 and the structure 300 based on the nominal three-dimensional location(s) of the one or more structural features 320 extracted from the as-designed digital model 150. In this regard, the processor 130 uses triangulation to compute the respective positions of each camera 102 relative to the structure 300 based on the parameters (e.g., focal length, etc.) of the cameras 102. In the example of the tool positioning system 100 of FIGS. 2-10 which has exactly two cameras 102 (i.e., a first camera 106 and a second camera 108), the location of both the first camera 106 and the second cameras 102 is collectively represented by a local coordinate system 402 with origin located midway between the lens 104 of the first camera 106 and the lens 104 of the second camera 108.

In addition to determining the position of the cameras 102 relative to the structure 300, the above-noted process determines the orientation of the cameras 102 relative to the structure 300 based on the viewing directions 110 of the cameras 102. The orientation of the cameras 102 can be defined in terms of the orientation of the local coordinate system 402 (FIG. 2) of the cameras 102 relative to the global coordinate system 400 (FIG. 2) of the structure 300. In the present disclosure, the orientation of the cameras 102 is defined by the x-axis and y-axis of the local coordinate system 402 which is in the plane defined by the viewing directions 110 of the first camera 106 and the second camera 108, with the y-axis bisecting the angle between the viewing directions 110, as shown in FIG. 4.

In any of the examples disclosed herein, the processor 130 requires three or more unique elements 336 to allow the algorithm to converge on a single solution for the three-dimensional position of the tool 200 relative to the structure 300. If the unique elements 336 are not unique enough relative to other parts of the structure 300, the processor 130 may generate multiple solutions for the three-dimensional position of the tool 200. If multiple solutions are generated, then human intervention is implemented to select the appropriate position of the tool 200 from among the multiple solutions.

For examples of the tool positioning system 100 in which the cameras 102 are standalone cameras 120 as shown in FIGS. 1-5, the processor 130 compensates for the offset distance 124 (FIG. 3) between the standalone cameras 120 and the tool 200 to thereby establish the position of the tool 200 relative to the structure 300, as mentioned above. For examples of the tool positioning system 100 in which the cameras 102 are tool cameras 208 that are integrated into the tool 200 as shown in FIGS. 6-10, the position of the tool 200 is the position of the cameras 102.

Referring still to FIG. 11, the tool 200 can be an inspection instrument 202 (e.g., a 3D scanner) for inspecting the surfaces of a structure 300, as mentioned above. The inspection instrument 202 generates inspection data 206 documenting the results of an inspection. The inspection data 206 can include non-conformances in the structure 300 that are detected by the inspection instrument 202. Examples of non-conformances can include: corrosion of a metallic component, degradation of a surface coating, defects in fastener installations, and any one of a variety of other types of non-conformances. The processor 130 is configured to record (e.g., in the memory 132) the inspection data 206 and the position of the tool 200 relative to the structure 300 (i.e., the tool position 201—FIG. 11) at the time that the tool 200 generated the inspection data 206.

Referring to FIGS. 11-12, the processor 130 in some examples is configured to annotate a three-dimensional as-built digital model 160 of the structure 300 with the position of the tool 200 relative to the structure 300. In the present disclosure, the as-built digital model 160 is a digital representation of the physical structure 300 as manufactured and as modified during its operational life, and can be referred to as a digital twin of the structure 300. In this regard, the as-built digital model 160 can be continuously updated over time to reflect deviations and/or changes that have been made to the structure 300 relative to the as-designed digital model 150.

In some examples of the tool positioning system 100, the processor 130 can facilitate the construction and/or updating of the as-built digital model 160. For example, if the tool positioning system 100 is integrated into a 3D scanner 204 such as an ATOS scanner mentioned above, the processor 130 of the 3D scanner 204 can perform the dual functions of (1) scanning the surfaces of the structure 300 and generating a digital reconstruction of the scanned surfaces (e.g., of a local region 302) for inspection purposes, and (2) determining the position of the 3D scanner 204 relative to the structure 300 during the scanning operation. The reconstructed surface generated by the 3D scanner 204 can be used to update the as-built digital model 160. In addition, inspection data 206 resulting from analysis of the reconstructed surface can be used to annotate the as-built digital model 160.

For example, FIG. 12 shows a display screen 140 of a GUI 138 displaying a first image 116 and a second image 118 respectively of a portion of an aircraft 304 barrel section 308 captured by a first camera 106 and a second camera 108 of a 3D scanner 204 (e.g., FIG. 6) into which the tool positioning system 100 is integrated. Also shown on the display screen 140 is the as-built digital model 160 of the aircraft 304 annotated with the tool position 201 (e.g., in x,y,z coordinates) of the 3D scanner 204 relative to the barrel section 308, and the inspection data 206 generated by the 3D scanner 204. In addition, the boundaries of the local region 302 inspected by the 3D scanner 204 can be highlighted on the as-built digital model 160 as shown in FIG. 12.

In FIG. 12, the inspection data 206 includes details regarding the type of inspection instrument 202 (e.g., 3D scanner) and the type of non-conformance (e.g., missing fasteners). However, the inspection data 206 can include any type of non-conformance, and is not limited to missing fasteners. The inspection data 206 can include alternative or additional information such as the date and time of the inspection, the geographical location where the inspection was performed, and other detailed information associated with the inspection.

Figure 13:
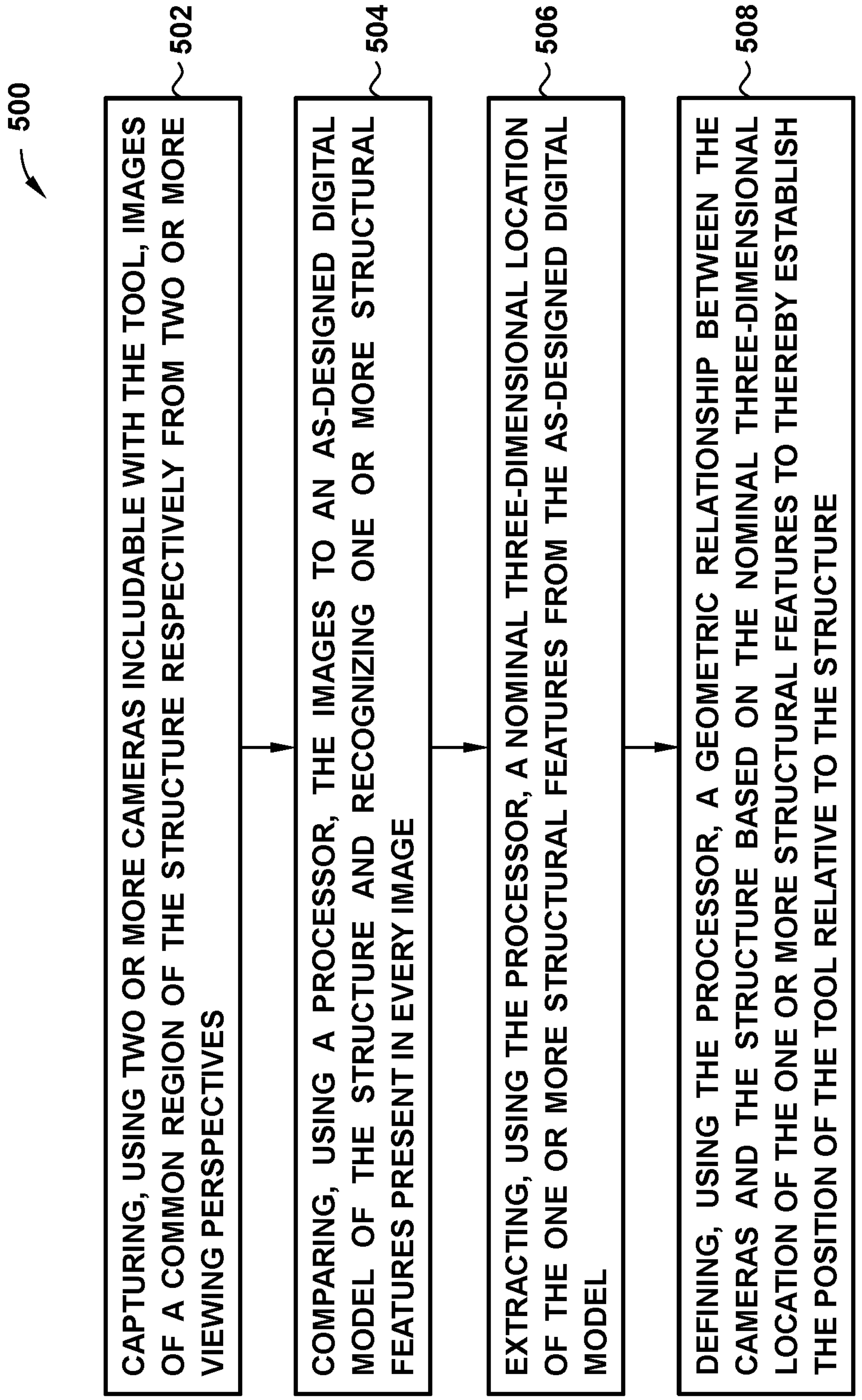
FIG. 13 is a flowchart of operations included in a method of establishing the position of a tool relative to a structure.

Referring to FIG. 13, shown is an example of a method 500 of establishing the position of a tool 200 relative to a structure 300. The method 500 is described in the context of an aircraft 304 as described above and shown in FIG. 1. However, the method 500 is applicable for establishing the position of a tool 200 relative to any one of a variety of different types of structures 300, and is not limited to an aircraft 304. In addition, although the method 500 is described in the context of establishing the position of a tool 200 in the form of a 3D scanner 204, the method 500 can be implemented for establishing the position of any one of a variety of different types of tools 200.

Step 502 of the method 500 includes capturing, using two or more cameras 102 includable with the tool 200, images 114 of a local region 302 of the structure 300 respectively from two or more viewing perspectives. As described above, the cameras 102 are part of a tool positioning system 100 that includes a processor 130 for processing the images 114 captured by the cameras 102. As mentioned above, the cameras 102 each have a unique viewing direction 110. which points generally toward a common local region 302 of the structure 300. In the example where the tool 200 is a 3D scanner 204, the local region 302 is part of the structure 300 that is scanned by the 3D scanner 204.

In some examples of the method 500, step 502 comprises capturing images 114 of the local region 302 using at least one standalone camera 120 mounted on the tool 200 as a separate component from the tool 200. For example, FIGS. 1-5 show a first camera 106 and a second camera 108 as standalone cameras 120 mounted on the 3D scanner 204. As shown in FIG. 3, the cameras 102 are spaced apart from the tool 200 by an offset distance 124. In such examples, the method 500 includes compensating for the offset distance 124 when establishing the position of the tool 200 relative to the structure 300.

In other examples of the method 500, step 502 comprises capturing images 114 of the local region 302 using at least one tool camera 208 that is integrated into the tool 200. For example, FIGS. 6-10 show a first camera 106 and a second camera 108 as part of the 3D scanner 204 and which are therefore configured to perform the dual functions of scanning the structure 300 to generate a digital reconstruction of the scanned surfaces, and determining the position of the 3D scanner 204 relative to the structure 300 during the scanning operation.

In some examples of the method 500, step 502 comprises capturing images 114 of the local region 302 using cameras 102 of a stationary tool 210 that is mounted to or supported on a fixed object. For example, FIGS. 1-5 show a stationary tool 210 supported on a floor 216 of a manufacturing facility via a tool support fixture 212. FIGS. 6-7 show a stationary tool 210 mounted on a tripod 214 which is supported on a floor 216. However, in other examples, the stationary tool 210 can be supported by any one of a variety of other types of fixed objects, and is not limited to supporting the tool 200 on a floor 216.

In still other examples, step 502 comprises capturing images 114 of the local region 302 using cameras 102 included with a non-stationary tool 218 that is coupled to a movable platform 220. For example, FIGS. 8-9 show a non-stationary tool 218 (e.g., a 3D scanner) supported by a drone 222 which is configured to hold the non-stationary tool 218 in three-dimensional space while the tool cameras 208 capture images 114 of the common local region 302 of the structure 300, and while scanning the surfaces of the structure 300 for assessing the condition of the structure 300 for the purpose of generating a digital reconstruction of the surfaces of structure 300 for inspection purposes.

Step 504 of the method 500 includes comparing, using the processor 130, the images 114 to an as-designed digital model 150 of the structure 300 and recognizing one or more structural features 320 present in every image 114. As described above, the as-designed digital model 150 includes structural features 320 that make up the structure 300. For example, the barrel section 308 of FIGS. 1-2 contains structural features 320 in the form of fasteners 326 (FIGS. 2, 4 and 5) and various structural components 332 such as window surrounds 324 (e.g., FIGS. 2 and 5), section joins 310 (FIG. 2), and any one of a variety of other structural components 332. Notably, as described above, the one or more structural features 320 used by the processor 130 in step 504 collectively include at least three unique elements 336 respectively at different locations on the structure 300, such as three or more fasteners 326 of a non-standard pattern 330 of fasteners 326 as shown in FIG. 5.

The process of recognizing one or more structural features 320 in the images 114 can be performed using a suitable object recognition technique such as image analysis or machine learning. One example of using image analysis for recognizing structural features 320 in step 504 comprises using an edge detection algorithm such as the Canny edge detector algorithm or other suitable edge detection technique. One example of using machine learning to recognize structural features 320 in the images 114 comprises using convolutional neural networks such as MobileNetV3™. However, step 504 can be performed using any one of a variety of suitable techniques, and is not limited to image analysis or machine learning.

Step 506 of the method 500 includes extracting, using the processor 130, the nominal three-dimensional location of the one or more structural features 320 from the as-designed digital model 150. As described above, the nominal three-dimensional locations of each structural feature 320 can be provided in terms of their local coordinates (e.g., x,y,z coordinates) relative to the origin of the global coordinate system 400. For example, the processor 130 can query the as-built digital model 160 to extract the x,y,z coordinates of each one of three or more fasteners 326 of a non-standard pattern 330 of fasteners 326 as shown in the example of FIG. 5.

Step 508 of the method 500 includes defining, using the processor 130, a geometric relationship between the cameras 102 and the structure 300 based on the nominal three-dimensional location(s) of the one or more structural features 320 to thereby establish the position of the tool 200 relative to the structure 300. As described above, the processor 130 uses triangulation to compute the geometric relationship between each camera 102 and the structure 300 based on the parameters (e.g., focal length, etc.) of the cameras 102. In establishing the geometric relationship between the cameras 102 and the structure 300, the processor 130 computes the respective position of each camera 102 relative to the structure 300. The collective position of the cameras 102 is defined in terms of the position of a local coordinate system 402 having an origin geometrically centered between the cameras 102. For example, in the tool positioning system 100 of FIGS. 2-10 which has a first camera 106 and a second camera 108, the origin of the local coordinate system 402 is located midway between the lens 104 of the first camera 106 and the lens 104 of the second camera 108.

In some examples, the method 500 includes annotating an as-built digital model 160 of the structure 300 with the position of the tool 200 relative to the structure 300. For example, shown in FIG. 12 is a display screen 140 of a computing device 134 displaying an as-built digital model 160 of the aircraft 304 of FIG. 1. The as-built digital model 160 has been annotated with the x,y,z coordinates of a 3D scanner 204 (i.e., the tool 200) relative to a barrel section 308 (i.e., the structure 300). In some examples, the method 500 further includes annotating the as-built digital model 160 with inspection data 206 generated by an inspection instrument 202 after inspecting the structure 300. For example, FIG. 12 shows the as-built digital model 160 of the aircraft 304 annotated with inspection data 206 comprising the type of inspection instrument 202 (e.g., 3D scanner 204) and the type of non-conformance (e.g., missing fasteners) detected as a result of analyzing the inspection data 206. In this regard, the method 500 can include displaying at least one of the following on a display screen 140 of a GUI 138: images 114 captured by the cameras 102, the as-designed digital model 150 of the structure 300, the structural feature 320 identified in the images 114, the position of the tool 200 relative to the structure 300, and/or the as-built digital model 160 of at least the local region 302 of the structure 300.

Many modifications and other versions and examples of the disclosure will come to mind to one skilled in the art to which this disclosure pertains having the benefit of the teachings presented in the foregoing descriptions and the associated drawings. The versions and examples described herein are meant to be illustrative and are not intended to be limiting or exhaustive. Although specific terms are employed herein, they are used in a generic and descriptive sense only and not for purposes of limitation. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled.

What is claimed is:

1. A tool positioning system for establishing the position of a tool relative to a structure, comprising:

a laser scanner configured to scan the structure;

two or more cameras integrated into the laser scanner, and the cameras are oriented at different angles and have different viewing directions, and each camera has camera parameters and is configured to capture an image of a common local region of the structure from a respective unique viewing perspective;

a processor configured to:

compare the images to an as-designed digital model of the structure and recognize one or more structural features that appear in every image;

extract a nominal three-dimensional location of the one or more structural features from the as-designed digital model;

compute, via triangulation, a respective position and orientation of each camera relative to the structure based on the nominal three-dimensional location of the one or more structural features and based on the viewing directions of the cameras and the camera parameters, to thereby establish a position of the laser scanner relative to the structure; and generate a digital reconstruction of the structure scanned by the laser scanner.

2. The tool positioning system of claim 1, wherein:

the laser scanner is a stationary laser scanner mounted to a fixed object.

3. The tool positioning system of claim 1, wherein:

the laser scanner is a non-stationary laser scanner that is coupled to a movable platform.

4. The tool positioning system of claim 1, wherein:

the processor is configured to annotate an as-built digital model of the structure with the position of the laser scanner relative to the structure.

5. The tool positioning system of claim 4, wherein:

the laser scanner is configured to scan exterior surfaces of the structure and generate inspection data; and the processor is configured to annotate the as-built digital model with the inspection data and the position of the laser scanner relative to the structure at time of recording the inspection data.

6. The tool positioning system of claim 1, further comprising a graphical user interface (GUI) configured to display at least one of the following:

the images captured by the cameras, the as-designed digital model of the structure, the structural feature identified in the images and its nominal three-dimensional location, the position of the laser scanner relative to the structure, an as-built digital model of at least the local region of the structure.

7. The tool positioning system of claim 6, wherein:

the processor is configured to highlight on the graphical user interface one or more boundaries of the local region on the as-built digital model.

8. The tool positioning system of claim 1, wherein:

the laser scanner is a time-of-flight scanner.

9. The tool positioning system of claim 1, wherein:

the processor is configured to update an as-built digital model of the structure based on the digital reconstruction.

10. An inspection instrument, comprising:

a laser scanner configured to scan exterior surfaces of a structure;

two cameras integrated into the laser scanner and oriented at different angles and having different viewing directions, and each camera has camera parameters and is configured to capture at least one image of a common local region of the structure from a respective unique viewing perspective;

a processor configured to:

generate inspection data of the structure based on scanning of the exterior surfaces of the structure by the laser scanner;

compare the images captured by the cameras to an as-designed digital model of the structure, and recognize one or more structural features present in every image;

extract a nominal three-dimensional location of the one or more structural features from the as-designed digital model;

compute, via triangulation, a respective position and orientation of each camera relative to the structure based on the nominal three-dimensional location of the one or more structural features and based on the viewing directions of the cameras and the camera parameters, to thereby establish a position of the laser scanner relative to the structure at time of generating the inspection data; and generate a digital reconstruction of the exterior surfaces scanned by the laser scanner.

11. The inspection instrument of claim 10, wherein:

the processor is configured to annotate an as-built digital model with the inspection data and the position of the inspection instrument relative to the structure at time of recording the inspection data.

12. A method of establishing the position of a laser scanner relative to a structure, comprising:

scanning, using a laser scanner, exterior surfaces of a structure;

capturing, using two or more cameras integrated into the laser scanner and oriented at different angles and having different viewing directions, images of a common local region of the structure respectively from two or more respective viewing perspectives, and each camera has camera parameters;

comparing, using a processor, the images to an as-designed digital model of the structure and recognizing one or more structural features present in every image;

extracting, using the processor, a nominal three-dimensional location of the one or more structural features from the as-designed digital model;

computing, via triangulation using the processor, a respective position and orientation of each camera relative to the structure based on the nominal three-dimensional location of the one or more structural features and based on the viewing directions of the cameras and the camera parameters, to thereby establish a position of the laser scanner relative to the structure; and generating, using the processor, a digital reconstruction of the exterior surfaces scanned by the laser scanner.

13. The method of claim 12, wherein capturing images of the local region comprises:

capturing images of the local region using the cameras integrated into a stationary laser scanner mounted to a fixed object.

14. The method of claim 12, wherein capturing images of the local region comprises:

capturing images of the local region using the cameras integrated into a non-stationary laser scanner that is coupled to a movable platform.

15. The method of claim 12, further comprising:
annotating an as-built digital model of the structure with the position of the laser scanner relative to the structure.

16. The method of claim 15, wherein annotating the as-built digital model of the structure with the position of the laser scanner relative to the structure further comprises:
annotating the as-built digital model of the structure with inspection data generated by the laser scanner after scanning the exterior surfaces of the structure.

17. The method of claim 12, further comprising:
displaying on a graphical user interface (GUI) at least one of the following: the images captured by the cameras, an as-designed digital model of the structure, the structural feature identified in the images, the position of the laser scanner relative to the structure, an as-built digital model of at least the local region of the structure.

18. The method of claim 17, wherein displaying on the graphical user interface includes:
highlighting one or more boundaries of the local region on the as-built digital model.

19. The method of claim 12, wherein scanning the exterior surfaces of the structure comprises:
scanning the exterior surfaces using a time-of-flight scanner as the laser scanner.

20. The method of claim 12, further comprising:
updating an as-built digital model of the structure based on the digital reconstruction.

* * * * *